(12) United States Patent
Li

(10) Patent No.: US 7,484,462 B2
(45) Date of Patent: Feb. 3, 2009

(54) PERMANENT MAGNETIC LEVITATION APPARATUS

(76) Inventor: Lingqun Li, Tower A, Bldg., No. 14, Chuangye Yuan, Shuang D Gang, Gaoxinyuanqu, No. 12, Liaohedonglu Dalian, 116620 (CN)

( * ) Notice: Subject to any disclaimer, the term of this patent is extended or adjusted under 35 U.S.C. 154(b) by 257 days.

(21) Appl. No.: 11/412,468

(22) Filed: Apr. 27, 2006

(65) Prior Publication Data

US 2006/0243157 A1    Nov. 2, 2006

(51) Int. Cl.
*B60L 13/04* (2006.01)
*B60L 13/06* (2006.01)

(52) U.S. Cl. .................................... 104/281; 104/284
(58) Field of Classification Search ............... 104/281, 104/284, 283, 285, 286
See application file for complete search history.

(56) References Cited

U.S. PATENT DOCUMENTS

| | | | | |
|---|---|---|---|---|
| 6,510,799 | B2 * | 1/2003 | Lamb et al. | 104/281 |
| 6,633,217 | B2 * | 10/2003 | Post | 335/306 |
| 6,664,880 | B2 * | 12/2003 | Post | 335/306 |
| 6,827,022 | B2 * | 12/2004 | van den Bergh et al. | 104/284 |
| 6,899,036 | B2 | 5/2005 | Lamb et al. | |
| 7,243,604 | B2 * | 7/2007 | Li | 104/139 |
| 7,314,008 | B2 * | 1/2008 | Li | 104/281 |
| 2002/0163329 | A1 * | 11/2002 | D'Alpaos et al. | 324/207.16 |
| 2003/0205163 | A1 | 11/2003 | Lamb et al. | |
| 2005/0223934 | A1 * | 10/2005 | Li | 104/123 |
| 2005/0252407 | A1 * | 11/2005 | Li | 104/139 |
| 2006/0243157 | A1 * | 11/2006 | Li | 104/281 |
| 2006/0243158 | A1 * | 11/2006 | Li | 104/281 |

FOREIGN PATENT DOCUMENTS

CN    1557650 A    1/2004

OTHER PUBLICATIONS

Wei, Qingchao and Kong, Younjian: "Magnetic Levitation Railway System and Technique", p. 19, para. 4, Ch. 1, *China Science and Technology Publ. Co.*, Nov. 2003.

* cited by examiner

*Primary Examiner*—S. Joseph Morano
*Assistant Examiner*—Jason C Smith
(74) *Attorney, Agent, or Firm*—Hunton & Williams LLP

(57) ABSTRACT

A permanent magnetic levitation apparatus comprises a permanent magnetic track unit and permanent magnetic levitation wing unit provided on a magnetic levitation vehicle and levitated above the track unit, in which the wing unit includes a ferromagnetic wing trough having an open bottom, a wing permanent magnet disposed in the wing trough, and non-ferromagnetic spacers which are disposed between the side walls of the wing trough and the wing permanent magnet, and the track unit includes a ferromagnetic track trough having an open top, a track permanent magnet disposed in the track trough, and non-ferromagnetic spacers disposed between the side walls of the track trough and the track permanent magnet, so that the wing permanent magnet and the track permanent magnet are disposed so that their poles with the same polarities face each other. With the above apparatus, the static magnetic energy is concentrated on the open top of the track trough and the open bottom of the wing trough so as to generate great repulsion forces.

9 Claims, 2 Drawing Sheets

PERMANENT MAGNETIC LEVITATION APPARATUS

BACKGROUND OF THE INVENTION

1. Technical Field of the Invention

The present invention relates to a technique of permanent magnetic levitation vehicle, and more particularly, to a permanent magnetic levitation apparatus comprising a permanent magnetic track unit and a permanent magnetic levitation wing unit.

2. Description of the Related Art

The levitation forces of the permanent magnetic levitation vehicle are resulted from the repulsion forces generated between the poles of the track permanent magnets and the poles of vehicle permanent magnets which face that of the track permanent magnets and have the same polarity as that of the poles of the track permanent magnets. The current permanent magnets provided on the track unit and the vehicle are formed by directly fixing permanent magnetic material on ferromagnetic based plates respectively. The above method is effective, however loss of the rest energy is high and the amount of the expensive hard-magnetic materials used for permanent magnets such as NdFeB is increased, so that the manufacture cost is increased and resources are wasted.

The above-mentioned levitation techniques are referred to the Chinese Patent Publication No. CN1264660A entitled "*tube vacuum permanent magnetic compensation type levitation train-elevated railway-station system*".

SUMMARY OF THE INVENTION

One aspect of the present invention is to solve at least part of the above problems occurred in the prior art.

One embodiment of the present invention provides a permanent magnetic levitation apparatus, comprising:

a permanent magnetic track unit including:
- a ferromagnetic track trough which is open at a top thereof and has a first side wall and a second wall opposed to each other,
- a track permanent magnet disposed in the track trough, in which a N pole of the track permanent magnet is positioned at the open top of the track trough,
- first and second non-ferromagnetic spacers which are disposed between the first and second side walls of the track trough and the track permanent magnet, respectively, a permanent magnetic levitation wing unit on a magnetic levitation vehicle, the permanent magnetic levitation wing being levitated over the permanent magnetic track unit and including:
- a ferromagnetic wing trough which is open at a bottom thereof and has a first side wall and a second side wall opposed to each other,
- a wing permanent magnet disposed in the wing trough and corresponds to the track permanent magnet, in which a N pole of the wing permanent magnet is positioned at the open bottom of the wing trough so as to face the N pole of the track permanent magnet in the track trough, and the track permanent magnet has a width substantially equal to that of the wing permanent magnet,
- third and fourth non-ferromagnetic spacers which are disposed between the first and second side walls of the wing trough and the wing permanent magnet respectively.

According to another embodiment of the present invention, the wing permanent magnet is provided with countersinks for fixing the wing permanent magnet to a top of the wing trough by means of screws, and wherein the top of the wing trough is provided with countersinks for mounting the wing trough to a wing base for the vehicle.

According to still another embodiment of the present invention, the track permanent magnet is provided with countersinks for fixing the track permanent magnet to a bottom of the track trough by means of screws, and wherein the bottom of the track trough is provided with countersinks for mounting the track trough to a track base.

Preferably, thickness of the wing permanent magnet is approximately 1 to 3 times larger than that of the track permanent magnet.

More preferably, the thickness of the wing permanent magnet is approximately 2 times larger than that of the track permanent magnet.

According to the present invention, when the wing permanent magnet is mounted in the ferromagnetic wing trough and the track permanent magnet is mounted in the ferromagnetic track trough so that the identical poles of the wing and track permanent magnets face each other, then magnetic force lines of approximately parabola shape are generated from the wing permanent magnet to the first and second side walls of the wing trough, and from the track permanent magnet to the first and second side walls of the track trough, respectively. The magnetic circuit of the permanent magnetic levitation apparatus according to the present invention can concentrate the static magnetic energy on the open bottom of the wing trough and the open top of the track trough so that great repulsion forces can be generated.

DETAILED DESCRIPTION OF THE PREFERRED EMBODIMENTS OF THE INVENTION

Embodiments of the present invention will be described in detail with reference to the accompany drawings, the embodiments described herein are explanatory and illustrative and shall not be construed to limit the present invention.

Figure 1:
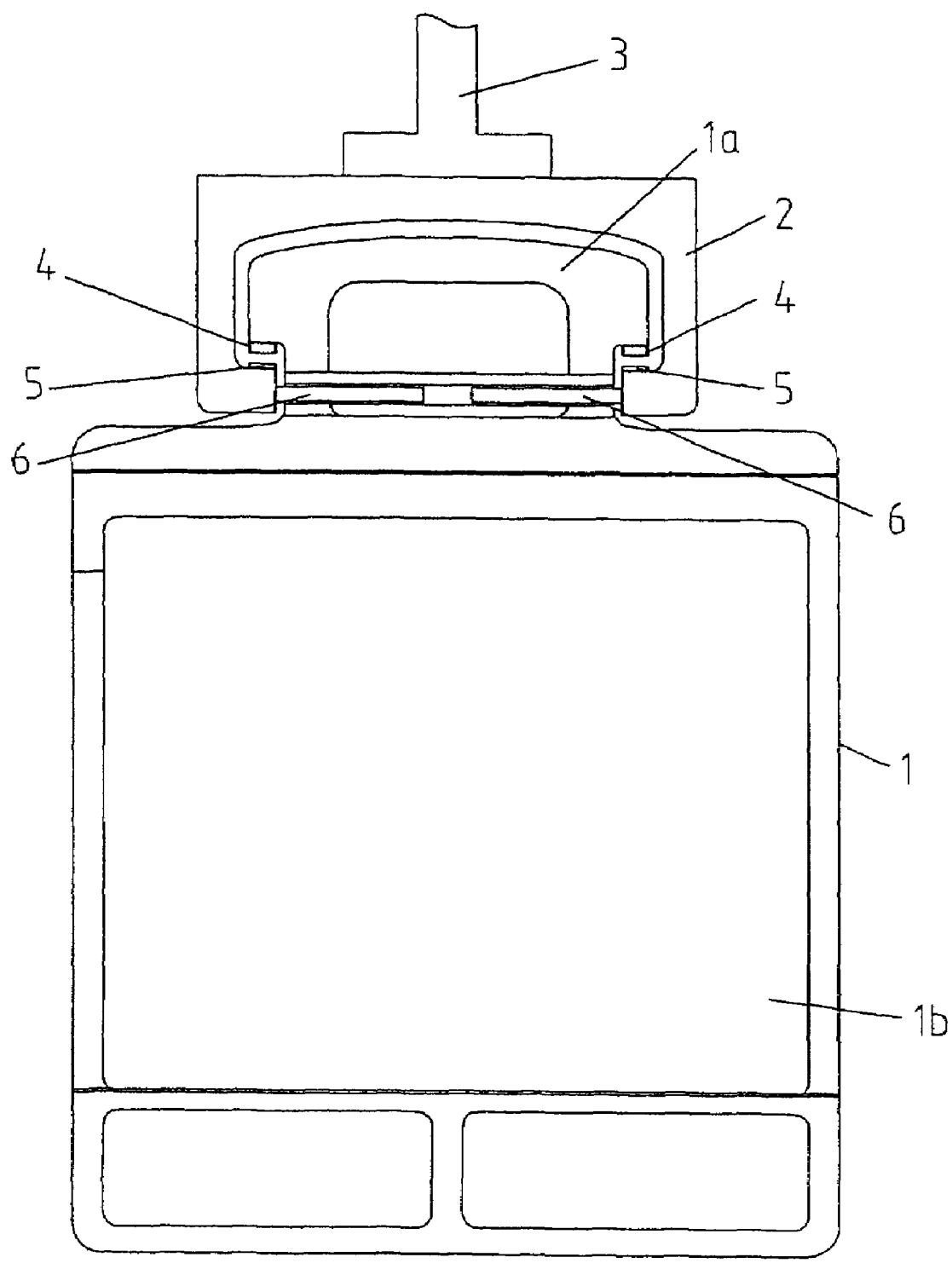
FIG. 1 is a schematic view showing a suspending track magnetic levitation vehicle system with the permanent magnetic levitation apparatus according to an embodiment of the present invention.

FIG. 1 is a schematic view showing a suspending track magnetic levitation vehicle system with the permanent magnetic levitation apparatus according to an embodiment of the present invention. As shown in FIG. 1, a magnetic levitation vehicle 1 comprises a magnetic levitation cabin 1a at an upper portion thereof and a compartment 1b at a lower portion thereof. The magnetic levitation cabin 1a is levitated in a suspending arch crosstie 2 which is fixed to a lower portion of an I beam 3. Permanent magnetic levitation wings 4 are symmetrically disposed at two sides of the magnetic levitation cabin 1a and levitated above permanent magnetic tracks 5 respectively. The magnetic levitation cabin 1a is centrally supported between two tracks 5 by means of guide wheels 6.

Figure 2:
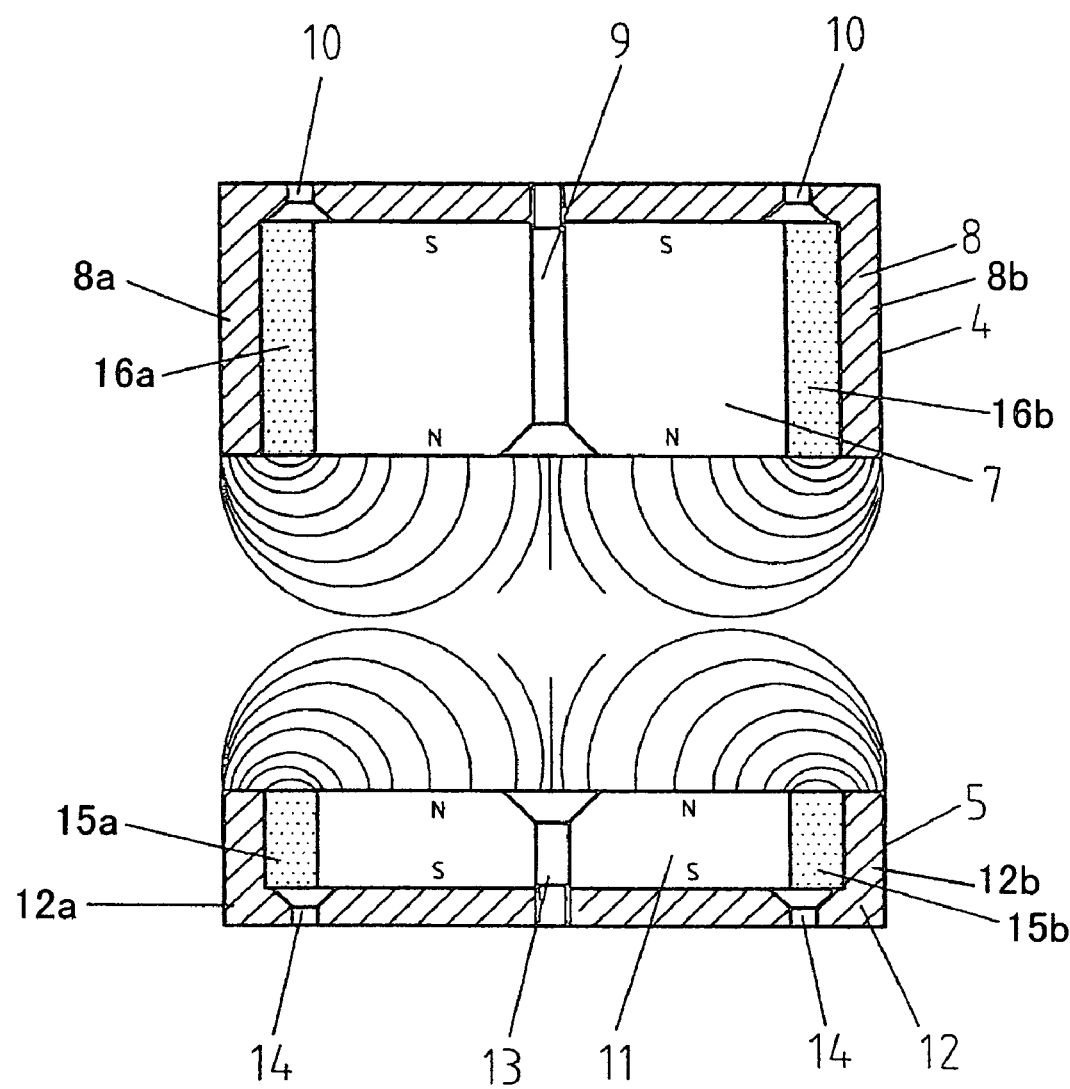
FIG. 2 is a schematic view showing the structure and magnetic force line distribution of the permanent magnetic levitation apparatus according to the embodiment of the present.

FIG. 2 is a schematic view showing the structure and magnetic force line distribution of the permanent magnetic levitation apparatus according to the embodiment of the present, in which a permanent magnetic levitation wing unit 4 and a permanent magnetic track unit 5 of the permanent magnetic levitation apparatus according to this embodiment of the present invention are shown. The poles of the permanent magnetic levitation wing unit 4 and the poles of the permanent magnetic track unit 5 having the same polarity with those of the permanent magnetic levitation wing unit 4 face each other, and the permanent magnetic levitation wing unit 4 is levitated above the permanent magnetic track unit 5.

As shown in FIG. 2, the permanent magnetic track unit 5 comprises a ferromagnetic track trough 12, in which a top (the upper side in FIG. 2) of the ferromagnetic track trough 12 is open (that is, the ferromagnetic track trough 12 is opened upwardly) and the ferromagnetic track trough 12 has a first side wall 12a and a second wall 12b opposed to each other. A track permanent magnet 11 in shape of a block, for example, made of NdFeB, is disposed in the ferromagnetic track trough 12, in which a N pole of the track permanent magnet 11 is located at the open top (the upper side in FIG. 2) of the ferromagnetic track trough 12. Alternatively, an S pole of the track permanent magnet 11 may be located at the open top of the ferromagnetic track trough 12.

The track permanent magnet 11 is provided with a countersink 13 at center portions thereof, and the countersink 13 is used for fixing the track permanent magnet 11 to a bottom of the track trough 12 by means of screws. A countersink 14 is provided at each side of the bottom of ferromagnetic track trough 12 and used for fixing the ferromagnetic track trough 12 to a track base (see FIG. 1) by means of screws. First and second non-ferromagnetic spacers 15a and 15b, for example, made of aluminum alloy, are disposed between the first and second side walls 12a, 12b of the track trough 12 and the track permanent magnet 11, respectively.

The permanent magnetic levitation wing unit 4 on a magnetic levitation vehicle comprises a ferromagnetic wing trough 8 having a first side wall 8a and a second side wall 8b opposed to each other, and the bottom of the wing trough 8 is open (that is, the ferromagnetic wing trough 8 is opened downwardly). A wing permanent magnet 7 is disposed in the ferromagnetic wing trough 8 so as to correspond to the track permanent magnet 11 in the track trough 12. That is, the open bottom of the ferromagnetic wing trough 8 corresponds to and faces the open top of the ferromagnetic track trough 12. The wing permanent magnets 7 corresponds to and face the track permanent magnet 11, and a N pole of the wing permanent magnet 7 is located on the open bottom of the ferromagnetic wing trough 8, so that the N pole of the wing permanent magnet 7 corresponds to and faces the N pole of the track permanent magnet 11.

Alternatively, the S pole of the wing permanent magnet 7 may be located on the open bottom of the ferromagnetic wing trough 8, so that the S pole of the wing permanent magnet 7 in the wing trough 8 corresponds to and face the S pole of the track permanent magnet 11 in the track trough 12.

A countersink 9 is provided in a central portion of the wing permanent magnet 7 so as to fix the wing permanent magnets 7 in the ferromagnetic wing trough 8 by means of screws. A countersink 10 is provided at each side of the top of ferromagnetic wing trough 8 and used for fixing the ferromagnetic wing trough 8 to a vehicle wing base (see FIG. 1) by means of screws. Third and fourth non-ferromagnetic spacers 16a and 16b, for example, made of aluminum alloy, are disposed between the first and second side walls 8a, 8b of the wing trough 8, respectively.

As described above, in the present embodiment, the track permanent magnet 11 and the wing permanent magnet 7 are disposed so that the poles having the same polarities face each other. According to this embodiment, as shown in FIG. 2, the N pole of the track permanent magnet 11 is located at the open top of the track trough 12 and the N pole of the wing permanent magnet 7 is located at the open bottom of the wing trough 8, so that when the track permanent magnet 11 and the wing permanent magnet 7 are disposed in the track trough 12 and the wing trough 8 respectively during use, the N pole of the wing permanent magnet 7 faces the N pole of the track permanent magnet 11, and the wing permanent magnet 7 has a width (size in ring-and-left direction in FIGS. 1 and 2) substantially equal to that of the track permanent magnet 11. As described above, the track permanent magnet 11 and the wing permanent magnet 7 can be disposed so that their S poles face each other.

According to this embodiment of the present invention, when the wing permanent magnet 7 and the track permanent magnet 11 are disposed in the wing trough 8 and the track trough 12 respectively, magnetic force lines of approximately parabola shape are generated from the wing permanent magnet 7 to the first and second side walls 8a, 8b of the wing trough 8, and similarly, magnetic force lines of approximately parabola shape are generated from the track permanent magnet 11 to the first and second side walls 12a, 12b of the track trough 12.

Because the magnetic polarity of the side walls of the track trough 12 is opposite to that of the track permanent magnet 11 on the open top of the tack trough 12, and the magnetic polarity of the side walls of the wing trough 8 is opposite to that of the wing permanent magnet 11 on the open bottom of the tack trough 8, and because the upper surfaces of the side walls 12a, 12b of the track trough 12 and the upper surface of the track permanent magnet 11 on the open top of the tack trough 12 are leveled to each other and spaced apart by the first and second non-ferromagnetic spacers 12a, 12b, and the bottom surfaces of side walls 8a, 8b of the wing trough 8 and the bottom surface of the track permanent magnet 11 on the open bottom of the tack trough 8 are leveled to each other and spaced apart by the third and fourth non-ferromagnetic spacers 16a, 16b, and because the magnetizing directions of the track permanent magnet 11 and wing permanent 7 is perpendicular to the top surface of the track trough 12 and the bottom surface of the wing trough 8 which faces the top surface of the track trough 12, the magnetic force lines between the track permanent magnet 11 and the first side wall 12a of the track trough 12 are symmetrical in shape with that between the track permanent magnet 11 and the second side wall 12b of the track trough 12. Also, the magnetic force lines between the wing permanent magnet 7 and the first side wall 8a of the wing trough 8 are symmetrical in shape with that between the wing permanent magnet 7 and the second side wall 8b of the wing trough 8. Therefore, with the above structure, the static magnetic energy is concentrated on the top surface of the track trough 12 and the bottom surface of the wing trough 8. When the permanent magnetic levitation wing unit 4 is disposed above the a permanent magnetic track unit 5, great repulsion forces are generated between the wing permanent magnet 7 and the track permanent magnet 11.

According to this embodiment of the present invention, the wing trough 8 has a wall thickness substantially equal to that of the track trough 12 and the thicknesses of the first and second non-ferromagnetic spacers 12a and 12b in the track trough 12 are substantially equal to that of the third and fourth non-ferromagnetic spacers 16a and 16b in the wing trough 8. The wing permanent magnet 7 has a width substantially equal to that of the track permanent magnet 11.

Preferably, a thickness of the wing permanent magnet 7 is approximately 1 to 3 times larger than that of the track permanent magnet 11. More preferably, the thickness of the wing permanent magnet 7 is approximately 2 times larger than that of the track permanent magnet 11. Such thickness ratio results in that less track magnets are used and a desirable levitation effect is obtained.

The magnetic levitation vehicle employed the permanent magnetic levitation apparatus according to the present invention has following advantages:

1. the amount of the track magnets for usage is decreased by about 50%;
2. the levitation forces are increased by about 48%;
3. the magnetic circuit is unobstructed and the permanent magnets are not easy to be demagnetized.

While preferred embodiments of the invention have been described and illustrated above, it should be understood that these are exemplary of the invention and are not to be considered as limitation. Additions, omissions, substitutions and other modifications can be made without departing from the sprit or scope of the present invention. Accordingly, the invention is not to be considered as being limited by the foregoing description, and is only limited by the scope of the appended claims and the equivalents thereof.

What is claimed is:

1. A permanent magnetic levitation apparatus, comprising:
   a permanent magnetic track unit including:
   a ferromagnetic track trough which is open at a top thereof and has a first side wall and a second wall opposed to each other,
   a track permanent magnet disposed in the track trough, in which a N pole of the track permanent magnet is positioned at the open top of the track trough,
   first and second non-ferromagnetic spacers which are disposed between the first and second side walls of the track trough and the track permanent magnet, respectively,
   a permanent magnetic levitation wing unit on a magnetic levitation vehicle, the permanent magnetic levitation wing being levitated over the permanent magnetic track unit and including:
   a ferromagnetic wing trough which is open at a bottom thereof and has a first side wall and a second side wall opposed to each other,
   a wing permanent magnet disposed in the wing trough and correspond to the track permanent magnet, in which a N pole of the wing permanent magnet is positioned at the open bottom of the wing trough so as to face the N pole of the track permanent magnet in the track trough, and the track permanent magnet has a width substantially equal to that of the wing permanent magnet,
   third and fourth non-ferromagnetic spacers which are disposed between the first and second side walls of the wing trough and the wing permanent magnet respectively, wherein magnetic force lines of approximately parabola shape are generated from the wing permanent magnet to the first and second side walls of the wing trough, and from the track permanent magnet to the first and second side walls of the track trough, respectively.

2. The permanent magnetic levitation apparatus according to claim 1, wherein a thickness of the wing permanent magnet is approximately 1 to 3 times larger than that of the track permanent magnet.

3. The permanent magnetic levitation apparatus according to the claim 2, wherein the thickness of the wing permanent magnet is approximately 2 times larger than that of the track permanent magnet.

4. The permanent magnetic levitation apparatus according to the claim 1, wherein the wing permanent magnet is provided with countersinks for fixing the wing permanent magnet to a top of the wing trough by means of screws, and wherein the top of the wing trough is provided with countersinks for mounting the wing trough to a wing base for the vehicle.

5. The permanent magnetic levitation apparatus according to claim 4, wherein a thickness of the wing permanent magnet is approximately 1 to 3 times larger than that of the track permanent magnet.

6. The permanent magnetic levitation apparatus according to the claim 5, wherein the thickness of the wing permanent magnet is approximately 2 times larger than that of the track permanent magnet.

7. The permanent magnetic levitation apparatus according to the claim 1, wherein the track permanent magnet is provided with countersinks for fixing the track permanent magnet to a bottom of the track trough by means of screws, and wherein the bottom of the track trough is provided with countersinks for mounting the track trough to a track base.

8. The permanent magnetic levitation apparatus according to claim 7, wherein a thickness of the wing permanent magnet is approximately 1 to 3 times larger than that of the track permanent magnet.

9. The permanent magnetic levitation apparatus according to the claim 8, wherein the thickness of the wing permanent magnet is approximately 2 times larger than that of the track permanent magnet.

* * * * *